US012760710B2

(12) United States Patent
Michini et al.

(10) Patent No.: US 12,760,710 B2
(45) Date of Patent: Oct. 13, 2026

(54) UNMANNED AERIAL VEHICLE WIND TURBINE INSPECTION SYSTEMS AND METHODS

(71) Applicant: Skydio, Inc., San Mateo, CA (US)

(72) Inventors: Bernard J. Michini, Plymouth Meeting, PA (US); Fabien Blanc-Paques, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/904,174

(22) Filed: Oct. 2, 2024

(65) Prior Publication Data

US 2025/0101951 A1 Mar. 27, 2025

Related U.S. Application Data

(63) Continuation of application No. 17/475,751, filed on Sep. 15, 2021, now Pat. No. 12,116,979, which is a (Continued)

(51) Int. Cl.

*B64U 10/14* (2023.01)
*B64C 39/02* (2023.01)

(Continued)

(52) U.S. Cl.

CPC ............ *F03D 17/00* (2016.05); *B64C 39/024* (2013.01); *G06T 7/0004* (2013.01); *B64U 10/14* (2023.01); *B64U 2101/00* (2023.01); *B64U 2101/26* (2023.01); *B64U 2101/30* (2023.01); *B64U 2201/10* (2023.01); *F05B 2240/30* (2013.01);

(Continued)

(58) Field of Classification Search

None

See application file for complete search history.

(56) References Cited

U.S. PATENT DOCUMENTS

2004/0174542 A1 9/2004 Handman et al.
2012/0076345 A1 3/2012 Fritz et al.

(Continued)

FOREIGN PATENT DOCUMENTS

WO 2015082405 A1 6/2015

OTHER PUBLICATIONS

International Application No. PCT/US2017/040131, International Search Report, Written Opinion, 8 pages, Sep. 22, 2017.

*Primary Examiner* — Samuel D Fereja

(57) ABSTRACT

Methods, systems and apparatus, including computer programs encoded on computer storage media for an unmanned aerial vehicle (UAV) wind turbine inspection system. One of the methods includes obtaining first sensor information by an unmanned aerial vehicle (UAV), the first sensor information describing physical aspects of a wind turbine, including one or more blades of the wind turbine. An orientation of the blades of the wind turbine are determined based on the obtained first sensor information. A flight pattern for the UAV to inspect the blades of the wind turbine is determined, the flight pattern being based on the determined orientation of the blades. Each of the blades of the wind turbine is (Continued)

inspected by the UAV according to the determined flight pattern, the inspection including obtaining second sensor information describing the blades of the wind turbine.

20 Claims, 10 Drawing Sheets

Related U.S. Application Data continuation of application No. 15/637,952, filed on Jun. 29, 2017, now Pat. No. 11,149,717.

(60) Provisional application No. 62/357,274, filed on Jun. 30, 2016.

(51) Int. Cl.

| | |
|---|---|
| ***F03D 17/00*** | (2016.01) |
| ***G06T 7/00*** | (2017.01) |
| *B64U 101/00* | (2023.01) |
| *B64U 101/26* | (2023.01) |
| *B64U 101/30* | (2023.01) |

(52) U.S. Cl.
CPC ... *F05B 2260/80* (2013.01); *F05B 2270/8041* (2013.01); *G06T 2207/10032* (2013.01); *G06T 2207/30164* (2013.01); *G06T 2207/30244* (2013.01); *Y02E 10/72* (2013.01)

(56) References Cited

U.S. PATENT DOCUMENTS

| | | | |
|---|---|---|---|
| 2012/0136630 | A1 | 5/2012 | Murphy et al. |
| 2012/0300059 | A1 | 11/2012 | Stege |
| 2014/0168420 | A1 | 6/2014 | Naderhirn et al. |
| 2014/0185912 | A1 | 7/2014 | Lim et al. |
| 2015/0043769 | A1* | 2/2015 | Newman ................. G06T 7/001 382/100 |
| 2015/0310604 | A1 | 10/2015 | Lim et al. |
| 2016/0017866 | A1* | 1/2016 | Craft ...................... H04N 7/185 348/46 |
| 2016/0292872 | A1* | 10/2016 | Hammond ............ G01S 17/933 |
| 2016/0305406 | A1* | 10/2016 | Zell ......................... B64C 27/04 |
| 2017/0122736 | A1 | 5/2017 | Dold et al. |
| 2017/0274991 | A1 | 9/2017 | Shiosaki et al. |

* cited by examiner

500

UNMANNED AERIAL VEHICLE WIND TURBINE INSPECTION SYSTEMS AND METHODS

CROSS-REFERENCE TO RELATED APPLICATION(S)

This application is a continuation of U.S. patent application Ser. No. 17/475,751, filed Sep. 15, 2021; which is a continuation of U.S. patent application Ser. No. 15/637,952, filed Jun. 29, 2017; which claims the benefit of priority to U.S. Provisional Patent Application No. 62/357,274, filed Jun. 30, 2016, the entire disclosure of each of which is hereby incorporated by reference.

BACKGROUND

Wind turbines face routine barrages from particulate matter, such as rocks, dust, and erosion of blades from rain, atmospheric contamination, lightning, and so on. Given the increasing reliance on renewable energy sources, a greater number of wind turbines are being installed and relied upon for power generation than in the past. Due to their design, even small amounts of leading edge erosion (e.g., on the blades) can negatively affect a wind turbine's performance and ability to generate power. The safe and efficient operation of wind turbines requires them to be routinely inspected and monitored for damage, and in general, one or more skilled workers are required to perform inspections. These skilled workers can be placed in harm's way by having to ascend such large structures and perform the inspections.

SUMMARY

Particular embodiments of the subject matter described in this specification can be implemented so as to realize one or more of the following advantages. Unmanned Aerial Vehicles (UAVs) can safely perform inspections of aerofoil-powered generators, such as wind turbines, without necessitating human workers be placed in danger. A UAV can, with minimal user input, determine flight plans to inspect a wide variety of wind turbines, including wind turbines with different numbers of turbine blades, and wind turbines with arbitrary orientations of non-moving blades. For instance, when inspecting a wind turbine, the blades can be set in a configuration such that they will not rotate (e.g., brakes can be applied to stop movement of the blades, and the blades can be set, locked, and so on, in place), and the positions of the blades can thus be random. The UAV can therefore automatically determine an orientation of the blades, which as will be described, can inform a subsequent flight plan to obtain sensor information, such as images (e.g., infrared, ultra-violet, visible, images), of the wind turbine's blades, hub, rotor, nacelle, and so on. The UAV can then perform the subsequent flight plan, and the obtained sensor information can be stored by one or more systems (e.g., for identification of damage).

In this way, wind turbines can be quickly inspected (e.g., inspected for damage, such as by capturing images of portions of the wind turbines) while allowing human operators to be safely located on a surface, such as the ground. Additionally, since the UAV can perform a determined flight plan (e.g., autonomously, or with minimal user input as will be described), an operator associated with the flight plan can have more limited training and expertise with respect to manually flying an aerial vehicle to perform inspections. That is, the flight planning system can democratize use of an UAV to perform inspections by reducing technical knowledge and skill necessary to perform the inspections.

In general, one innovative aspect of the subject matter described in this specification can be embodied in systems, computer readable media, and methods that include the actions of obtaining information describing physical aspects of a wind turbine to be inspected by the UAV; performing, by the UAV, one or more actions to determine an orientation of blades connected to the wind turbine, the orientation specifying an angle of each blade with respect to a reference associated with the wind turbine; and generating a flight plan based on the orientation of the blades and obtained information, the flight plan associated with inspecting the wind turbine.

The details of one or more embodiments of the subject matter of this specification are set forth in the accompanying drawings and the description below. Other features, aspects, and advantages of the subject matter will become apparent from the description, the drawings, and from the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
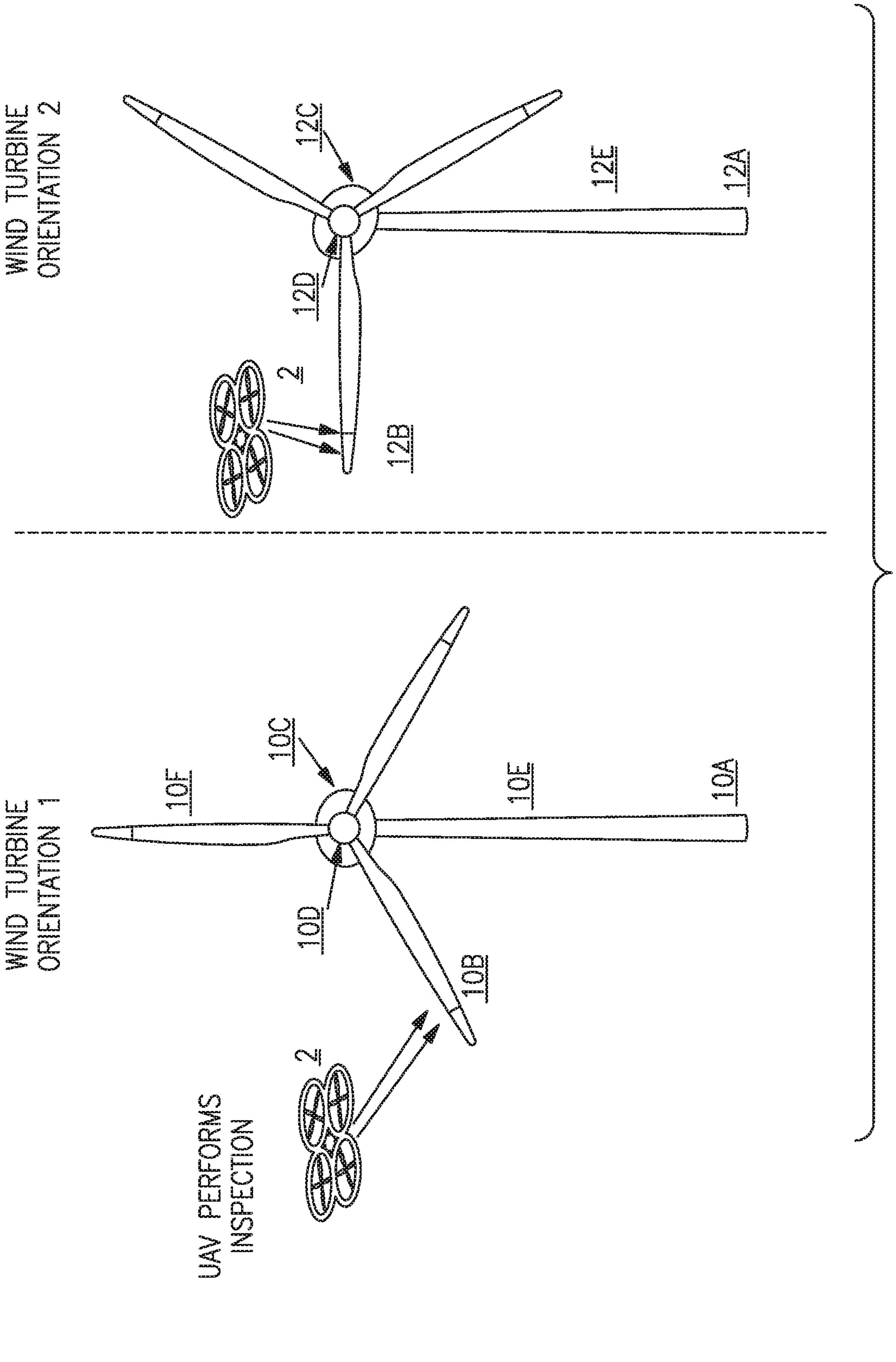
FIG. 1A illustrates examples of wind turbines being inspected by an Unmanned Aerial Vehicle (UAV).

This specifications describes an unmanned aerial vehicle (UAV) navigating according to one or more flight plans, with the flight plans (e.g. collectively) being associated with inspecting a wind turbine. For example, a first flight plan can be associated with the UAV determining an orientation of the wind turbine's blades (e.g., while at, such that the wind turbine can be inspected), such as determining an orientation of at least a first blade (e.g., an angle of the blade with respect to a circle sketched out by the tips of the blades, such as an angle associated with an offset from a particular position, for instance the first blade pointing vertically upwards). An example of two orientations of wind turbines, which both utilize three blades, is illustrated in FIG. 1A (e.g., wind turbine 10A and wind turbine 12A). The UAV can then generate a fight plan, optionally in combination with a user device in wired or wireless communication with the UAV, which enables the UAV to perform an inspection of the wind turbine based on the determined orientation.

As will be described, to determine an orientation of a wind turbine's blades, the UAV can perform one or more actions, a non-exhaustive list of which can include (1) utilizing a planar distance sensor while ascending/descending vertically (e.g., described below, with respect to FIG. 2B), (2) obtaining images of the wind turbine and determining the orientation using geometry information of the wind turbine (e.g., described below, with respect to FIG. 2C), (3) obtaining images of the rotor hub (also referred to as a center blade hub), including connections to the blades, and using a generated point cloud of the images to determine the orientation (e.g., described below in FIG. 2D), (4) ascending and determining an altitude of a tip of at least one blade, and utilizing geometry information of the wind turbine, determining an orientation of the blades (e.g., described below in FIG. 2E).

In this specification, geometry information includes any physical characteristic, aspect, of a wind turbine, and can include a location of a wind turbine (e.g., GNSS coordinates of a centroid of the wind turbine, a centroid of a support structure of the wind turbine, a horizontal position of the centroid of the support structure, and so on), height of the wind turbine (e.g., excluding the blades), a height of one or more portions or components of the wind turbine (e.g., a height of the rotor hub, such as a height of a centroid of the rotor hub), a number of blades, lengths of the blades, shape information of the blades (e.g., a shape of an airfoil, for example particular blades can be designed with a twist along their length from a steep pitch at a base to a shallower pitch at their tips), and so on. Optionally, a user of a system (e.g., an operator of a user device who is positioned proximate to the wind turbine, or a user of a server system who can assign inspections of wind turbines to operators) can specify the geometry information, and provide the information to a UAV. As will be described, the geometry information can be obtained from a company, regulatory agency, governmental entity, and so on, that maintains, controls, owns, operators, regulates, and so on, wind turbines. Optionally, the user can specify geometry information of a wind turbine by utilizing one or more user interfaces that include parameters associated with the geometry information, an example of which is described below with respect to FIG. 5. For instance, the user interface can include a value associated with a length of the blades, and the user can specify the length, or the user interface can automatically populate with the length (e.g., obtained from stored information that can include information obtained from companies, regulatory agencies, and so on as described above, or obtained from prior flight plans to inspect a wind turbine). The specified information can be provided to a UAV, which can utilize the information to determine an orientation and inspect a wind turbine.

Optionally, an operator associated with the inspection can determine the orientation of the blades, for instance the operator can obtain information from the wind turbine itself (e.g., a system comprising one or more processors, field programmable gate array, one or more sensors, and so on, included in the wind turbine can specify information that indicates the orientation of each blade), from a company that maintains, controls, the wind turbine, or through empirical measurements performed while proximate to the wind turbine. The operator can then utilize a user device in wired or wireless communication with the UAV to indicate the orientation, or can generate a flight plan on the user device that enables the UAV to perform an inspection of the wind turbine (e.g., based on the determined orientation).

Once the orientation of the wind turbine's blades have been determined, the UAV can perform an inspection of the wind turbine, such as the nacelle, blades, particular portions of the blades (e.g., portions within a threshold distance of leading edges), and so on. As will be described, the UAV can navigate according to one or more flight patterns, which in general, will enable the UAV to remain at one or more distances (e.g., a stand-off distance as will be described) from the blades while navigating along each blade. Since the orientation, as described above, has been determined, the UAV can ensure that it tracks the blades and properly obtains images of the blades (e.g., the UAV can estimate its position with respect to the blades, for instance using a global navigation satellite system 'GNSS' receiver, inertial navigation system 'INS'). Optionally, the UAV can utilize one or more sensors (e.g., cameras, distance sensors) to navigate along each blade. For example, utilizing a camera, the UAV can ensure that as the UAV navigates along a particular blade, a center of each obtained image corresponds to a same portion of the blade (e.g., the leading edge, a center of the blade, a same proportional distance from the leading edge to the trailing edge, and so on). Optionally, the UAV can receive (e.g., from a user device, or from an outside system, such as a server system) information indicating the orientation of the wind turbine, and the UAV can perform the inspection of the wind turbine using the received information.

After the inspection of the wind turbine is performed, the UAV can provide sensor information (e.g., images) obtained during the inspection to an outside system (e.g., a user device, a server system) for storage and processing. The outside system can associate each image with a portion of the wind turbine that it captures (e.g., the portion that is shown in an image), such that damage, and so on, can be identified in the images (e.g., automatically, or in combination with a user) and easily correlated to a real-world portion of the wind turbine (e.g., allowing the damage to be fixed). Additionally, the outside system can assign identifiers to each blade, for instance the blades may include unique markings, stickers, paintings, signs, and so on, so that damage to each blade can be monitored and tracked across successive inspections of the wind turbine.

In this specification, a wind turbine includes any aerofoil-powered generator, including horizontal-axis wind turbines, vertical-axis wind turbines, and so on, with any number of blades, such as airfoils. While the specification below generally describes inspecting horizontal-axis wind turbines, some or all of the specification can be applied to inspecting vertical-axis wind turbines. Various types of UAVs may be used to implement the inventions described herein (for example, a fixed wing airplane, helicopter, a multi-rotor vehicle (e.g., a quad-copter in single propeller and coaxial configurations), a vertical take-off and landing vehicle, lighter than air aircraft). A multi-rotor vehicle in a coaxial configuration may use the same propeller pitch and diameter propellers, use different pitch and diameter propellers, or variable pitch propellers. In this specification, UAVs include drones, un-operated aerial vehicles, remotely operated aircraft, unmanned aircraft systems, any aircraft covered under Circular 328 AN/190 classified by the International Civil Aviation Organization, and so on. Sensors, which are included in the general term payload (e.g., any hardware, software, module, and so on, that is not critical to the flight operation of the UAV), can include any device that captures real-world information, including cameras, radiation measuring instruments, distance detectors such as Lidar, Leddar, sonar, stereo-camera, and so on. While the specification describes obtaining images of a wind turbine, other sensors can be utilized and the specification is to be understood to include reference to these sensors where images, cameras, and so on, are referenced. For instance, infra-red, ultra-violet, and other wavelength, sensors and cameras can be utilized.

FIG. 1A illustrates examples of wind turbines 10A, 12A, being inspected by an Unmanned Aerial Vehicle (UAV) 2. Each wind turbine includes a support structure 10E, 12E, such as a pole, connected to a nacelle 10C, 12C, (e.g., a cover housing that houses all generating components in a wind turbine, such as the generator, gearbox, drive train, brake assembly, and so on). A rotor hub 10D, 12D, is connected to the nacelle 10C, 12C, and blades (e.g., blades 10B, 12B) extend from the rotor hub 10D, 12D. Optionally, the blades can be manipulated in one or more axes to increase power that can be extracted from wind, for instance the rotor hub 10D, 12D, can be manipulated about a yaw axis, and the blades can each be manipulated about a pitch axis (e.g., the angle of attack of each blade can be manipulated according to wind conditions).

As illustrated, the UAV is navigating according to a flight plan and performing an inspection of each wind turbine. Wind turbine 10A includes three blades offset from each other blade by a same angle, and includes the blades angled at 0, 120, 240, degrees about the rotor hub 10D. Wind turbine 12A includes three blades offset from each other blade by a same angle, includes the blades, for example, at 30, 150, 270, degrees about the rotor hub 12D. As described below, the different orientations of the wind turbines 10A, 12A, can be a result of the blades being stopped at arbitrary positions prior to being inspected.

Prior to a UAV conducting an inspection of a wind turbine, the wind turbine will, in general, have its blades locked in place. Brakes (e.g., the brake assembly included in the nacelle) can be applied such that the blades can be slowed down, and eventually stopped from moving due to kinetic energy of wind. Locks (e.g., pins) can be set that block movement of the blades during the inspection. Since the blades can move rapidly due to wind (e.g., 100, 200, mph at the tips), if the blades were not locked in place the UAV may be blown about due to wind turbulence, or may have trouble obtaining images, sensor information of the blades. Optionally, the blades can move, and the UAV can perform an inspection of each wind turbine at a stand-off distance set such that wind turbulence will not negatively affect navigation of the UAV (e.g., the distance can be based on measured wind conditions, speed of the blades, and ability of the UAV to remain stable based on wind conditions). The UAV can then utilize a lens with a focal length (e.g., a zoom lens) that enables detailed images to be obtained of the blades, and can utilize a shutter speed high enough to free motion of the blades. Optionally, the blades can be set at pitch angles that cause them to move less than a threshold speed, such that the UAV can obtain images of the blades as described above, and an entity (e.g., a company, regulatory agency, governmental entity, and so on) that maintains, controls, the wind turbine can merely adjust the pitch controls during the inspection.

As described above, the UAV 2 can obtain images of each wind turbine, including the support structure, nacelle, rotor hub, blades, and so on. Optionally, the UAV 2 can obtain images of particular portions of each wind turbine, such as the blades, nacelle, and rotor hub. An operator associated with the inspection can specify which portions of the wind turbines 10A, 12A, are to be inspected. The UAV 2 can also obtain images of particular portions of the blades, without obtaining images of other portions of the blades. For instance, the leading edges of the blades (e.g., leading edges of the airfoils) can be damaged, or otherwise negatively affected, by weather, particulate matter (e.g., carried by wind), and the ability of the wind turbine to extract power from the air can be substantially compromised by even relatively minor damage. Therefore, optionally the UAV 2 can obtain images of the leading edges of the blades, and portions of the blades within a threshold distance of the leading edges.

As an example of obtaining images of the blades, the UAV 2 can navigate along the length of each blade (e.g., blade 10B), and can position itself to be at a particular angle above the leading edge of the blade (e.g., a 20, 30, 45, 55, degree angle with respect to a horizontal defined by the leading edge). The UAV 2 can then navigate along the blade and obtain images of the blade, for instance with a camera pointing towards the leading edge. Since the UAV is the particular angle above the leading edge of the blade, images of the blade can include the leading edge (e.g., a portion of the leading edge that is visible) and top portions of the blade that extend from the leading edge. After obtaining images of the top portion of the blade, the UAV 2 can position itself to be at the particular angle below the leading edge of the blade. The UAV 2 can then navigate along the blade and obtain images of the blade, for instance with a camera pointing towards the leading edge.

The UAV can remain at a particular stand-off distance from the blade, which can be set at a constant value (e.g., based on capabilities of the UAV to remain stable based on wind conditions) to ensure that a risk of the UAV 2 striking or touching the wind turbine is reduced (e.g., a gust of wind may overpower the UAV 2 and cause it to move a distance). Additionally, the stand-off distance can be based on a required level of detail that is to be included in images of the wind turbine. For instance, a ground sampling distance, which represents a level of detail, can be specified (e.g., by a user, or the ground sampling distance can be a constant) in terms of a number of image pixels/distance, or a number of image pixels/distance2. Therefore, when the UAV 2 obtains images of the blades, for instance at the particular angle above the leading edges of the blades, the UAV 2 can be offset from the leading edges by the stand-off distance.

As will be described below, the UAV 2 can determine, or optionally receive information indicating, an orientation of the blades (e.g., as described above). To inspect the wind turbine 10A, the UAV 2 can utilize the orientation to determine locations at which the inspection is to occur. For instance, the UAV 2 can navigate along a first blade 10B of the wind turbine 10A, and can utilize the orientation information to determine a starting location of the first blade 10A (e.g., an angle of the first blade 10B). The UAV can further utilize geometry information of the wind turbine 10A, such as a length of the blade 10B, a height at which the blade 10B connects to the rotor hub 10D, and so on as will be described, to determine a location of the tip of the blade 10B. The UAV 2 can navigate to the tip of the blade 10B (e.g., navigate 30, 40, 45, 50, and so on, degrees above the leading edge of the tip of the blade at the particular stand-off distance) and obtain images of the blade 10B. The UAV 2 can then continue navigating along the blade 10B towards the center hub 10D obtaining images. Since the UAV 2 stores information indicating the orientation of the blades, the UAV 2 can navigate along a subsequent blade (e.g., the UAV can determine that a subsequent blade 10F is located 120 degrees offset from the blade 10B, and can ascend at the rotor hub and navigate similarly along the subsequent blade 10F).

Optionally, the UAV 2 can determine the orientation of the blades while performing an inspection of the wind turbine. For instance, the UAV 2 can navigate to an altitude above one of the blades, and using a camera, can identify a particular blade (e.g., blade 10B can be identified using one or more computer vision processes). The UAV 2 can then navigate in a direction towards the particular blade (e.g., the UAV 2 can ensure that a same portion of the particular blade is being kept in a field of view of the camera), and utilizing a distance sensor, can determine when the UAV is within a threshold distance of the particular blade (e.g., based on a ground sampling distance). The UAV can then navigate at the threshold distance along a length of the particular blade, utilizing an included camera to maintain a same portion of the blade in a center of the cameras view. For instance, the UAV 2 can ensure that the leading edge is included as a center of the cameras view, or if the UAV is set at a distance such that the UAV 2 can view the leading edge and the trailing edge of the particular blade, the UAV 2 can identify a spot a threshold distance from the leading edge, and navigate along the particular blade such that the spot is maintained at the threshold distance from the leading edge. While the UAV 2 is navigating along the particular blade, it can utilize one or more of an inertial navigation system (INS), GNSS receiver, to determine an angle that the UAV is ascending or descending with respect to a reference frame (e.g., a surface on which the wind turbine is located). This determined angle can be utilized to estimate the orientation of the particular blade. For instance, if the UAV is moving horizontally, the particular blade must be oriented at 90 degrees, or 270 degrees. Similarly, if the UAV is moving vertically, the particular blade must be orientated at 0 degrees or 180 degrees. The same process can be utilized by the UAV to estimate the orientation of other blades angled differently. After obtaining images of the particular blade, the UAV can reach the rotor hub, and move accordingly around the rotor hub at an angle based on the number of blades (e.g., the UAV 2 can move clockwise or counter-clockwise by 120 degrees, which can be based on a radius of the rotor hub). If the UAV 2 has determined the orientation of the particular blade, the UAV 2 navigate (e.g., ascend, descend, navigate horizontally) based on an expected orientation of a remaining blade. For instance, in the example wind turbine 10A, once the UAV 2 inspects blade 10B, and determines that the orientation is 240 degrees, the UAV 2 can simply navigate horizontally to blade 10C which is oriented at 120 degrees, and then begin inspecting blade 10C.

The UAV 2 can similarly obtain images of the remaining portions of each wind turbine, such as the nacelle, rotor hub, and optionally the support structure. After obtaining images of the wind turbine, the UAV 2 can navigate to a landing location (e.g., the UAV 2 can store one or more GNSS coordinates of landing locations, and can navigate to a landing location after the inspection). The UAV 2 can provide the obtained images to a system (e.g., a user device, or server system) for storage and processing. The system can determine correlations between images and portions of the wind turbine, and store the correlations. The correlations can be determined through use of one or more of, timestamps associated with each image, GNSS location information of the UAV associated with each image, inertial navigation system (INS) information associated with each image, and so on. As an example, if the UAV was navigating from a tip of a blade 10B to a rotor hub 10D, the system can utilize the INS information and location information to estimate a real-world position at a time of an image being obtained (e.g., a camera being triggered). The system can optionally utilize information describing a field of view of the camera to determine the portion of the blade 10B that is shown in the image. The field of view can be determined from a focal length(s) of a lens of the camera, a sensor resolution and sensor size of the camera (e.g., a crop sensor, such as APS-C, a 35 mm sensor), and so on. For instance, the field of view can be determined to specify a size of the portion of the blade 10B (e.g., dimensions of the blade 10B that would be included in an image based on the UAV's 2 distance, direction, from the blade 10B and field of view of the camera).

Optionally, the UAV 2 can utilize a downward facing camera to obtain images of a surface on which the wind turbines are placed (e.g., the ground), and monitor progression of the UAV 2 during an inspection. That is, whenever the UAV 2 obtains an image of the wind turbine (e.g., an image of a particular blade 10B), an image can similarly be obtained from the downward facing camera at a same time. The system can utilize the downward facing camera images to monitor movement of the UAV 2 with respect to the surface. Through a comparison with an image of the surface (e.g., the UAV 2 can perform a higher altitude initial photosurvey of a geographic region associated with the wind turbines 10A, 12A, or the image can be obtained from satellite images), the system can perform a feature matching process, and correlate each downward facing image to the image of the surface. From the comparisons, the UAV's 2 location in space (e.g., three-dimensional location) can be accurately determined (e.g., using information describing a field of view of the downward facing camera, an altitude of the UAV, and so on), such that images obtained of the wind turbine can be accurately correlated to portions of the wind turbine they illustrate. That is, the system can determine that for a particular downward facing image that corresponds to the UAV 2 being at a location mid-way along the length of the blade 10B, the image obtained of the wind turbine at the same time as the downward facing image was obtained, has to similarly illustrate a portion of the blade 10B mid-way along the length of the blade 10B.

In this way, the system can correlate images to portions of the wind turbine they illustrate. If damage is identified (e.g., automatically using one or more computer vision processes, or manually) in an image, the corresponding location on the wind turbine can be accurately determined. Additionally, the system can assign a label, or other identifier, to each blade of the wind turbines 10A, 12A, such that the blades can be monitored over time to determine degradation of the blades and images of portions of particular blades can be labeled accordingly. The system can identify a label, sign, marking (e.g., paint), and so on, that can be placed on the blades (e.g., at a time of manufacture, or after being placed on a wind turbine), and can associate the identified label, sign, marking, with the blade. In this way, if a particular blade is imaged at a later time, with the blades being in a different orientation, the blades can be recognized by the system and updated images of the blades can be viewed with respect to the older images of the blades.

Figure 1B:
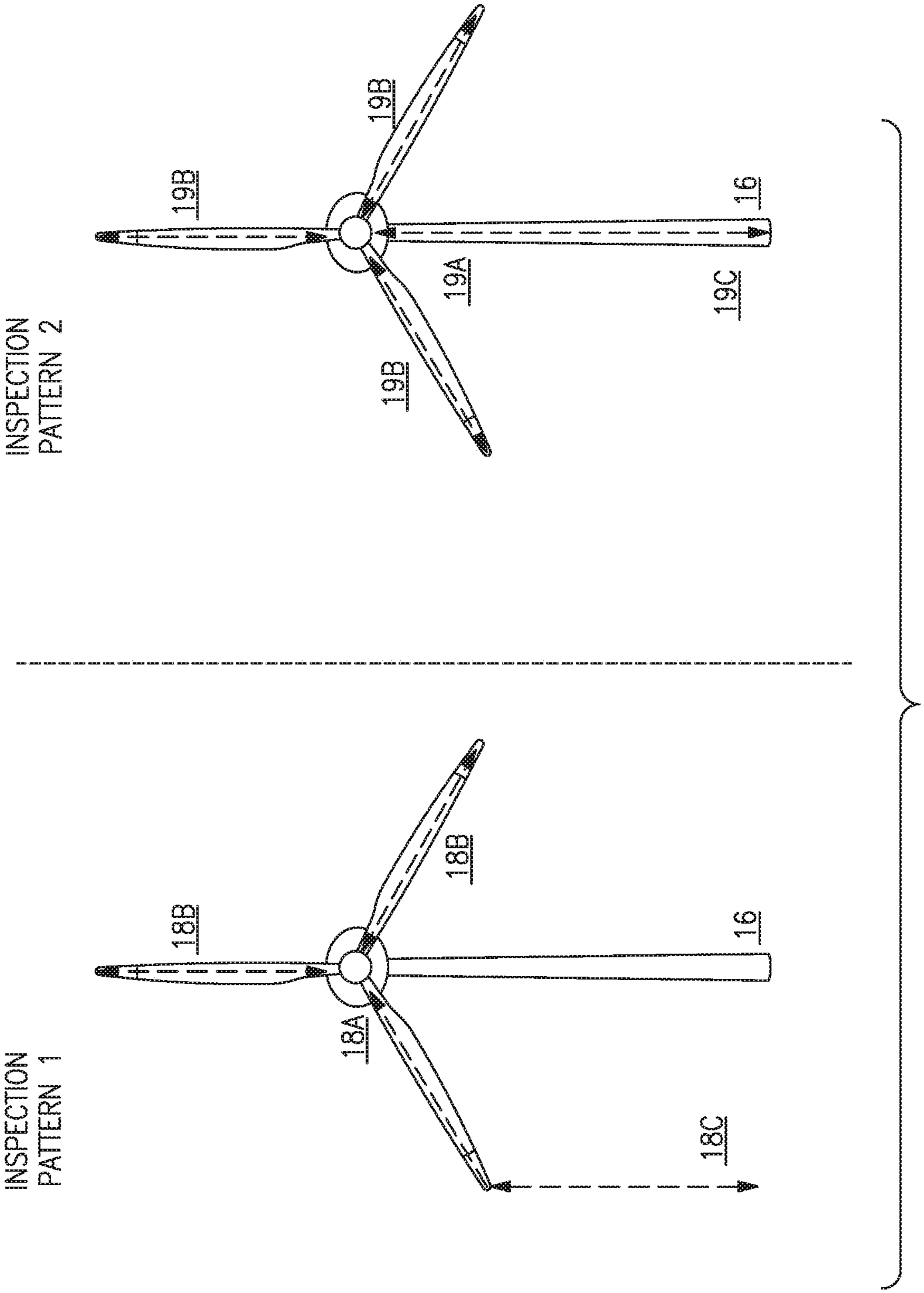
FIG. 1B illustrates a wind turbine and examples of inspection patterns.

FIG. 1B illustrates a wind turbine and examples of inspection patterns (e.g., flight patterns). As described above, a UAV (e.g., UAV 2) can navigate along each blade of a wind turbine (e.g., at a stand-off distance, or three-dimensional vector the magnitude of which is the stand-off distance, and at a particular angle from the blade, such as from the leading edge of the blade) and obtain sensor information of the blade (e.g., images, such as visible wavelength, infra-red wavelength, images of the blade. As will be described, a wind turbine 16 can be inspected according to multitudes of flight patterns, also called inspection patterns, two of which are illustrated in FIG. 1B (e.g., Inspection Pattern 1 and Inspection Pattern 2). The UAV can receive (e.g., in the flight package, flight plan) a predetermined value indicating lengths of blades of the wind turbine to be inspected (e.g., wind turbine 16).

Inspection Pattern 1 is associated with a particular flight pattern a UAV can implement to inspect the wind turbine 16. For instance, a flight package can be received by the UAV (e.g., from a user device of an operator) that includes a flight plan specifying the particular flight pattern. As illustrated, the particular flight pattern includes the UAV ascending from a particular location (e.g., a take-off location), which can be below at a horizontal position below a tip of a blade (e.g., a distal end of the blade, which is illustrated is angled at 240 degrees) or can be a threshold distance in front of or behind the wind turbine 16. The UAV can ascend and navigate to the tip (e.g., distal end), at which point the UAV can navigate along the blade until reaching the end of the blade (e.g., proximate end) to which the blade is coupled to the rotor hub (e.g., center blade hub The UAV can determine, as an example, that it's at the proximate end of the blade by monitoring a distance the UAV has traveled and comparing the distance to the length of the blades. For instance, the illustrated flight pattern includes a first portion 18A that represents the UAV ascending from the take-off location, along the blade until reaching the rotor hub. As described above, the UAV can obtain sensor information of the blade while navigating (e.g., images of the leading edge, images of the entirety of the blade that is visible from the field of view of the UAV, and so on).

Upon reaching the rotor hub, the UAV can navigate along a subsequent blade, which as illustrated in the example, can include navigating upwards along the blade at 0 degrees or navigating along the blade angled at 120 degrees. As an example, the UAV can navigate along the blade at 0 degrees, and obtain sensor information while ascending up the blade. The UAV can then navigate back down the blade and obtain sensor information while descending down the blade (e.g., the UAV can obtain sensor information of the top of the blade, and then subsequently obtain sensor information of the bottom of the blade). After reaching the rotor hub upon descending, the UAV would then navigate along the blade angled at 120 degrees to the tip (e.g., distal end), and then navigate back to the rotor hub.

The UAV can then navigate down the blade angled at 240 degrees and obtain sensor information of the blade, and upon reaching the tip of the blade (e.g., distal end), can navigate back to the take-off location (e.g., or a different landing location.

Inspection pattern 2 is associated with a flight pattern the UAV can implement to similarly inspect the wind turbine 16. The flight pattern is associated with the UAV navigating to the rotor hub, for instance portion 19A as illustrated. The UAV can navigate from a particular horizontal position to an altitude associated with the rotor hub (e.g., a centroid of the rotor hub, or other height, which can be received in the flight plan or flight package). The UAV can then navigate along each blade as described above, for instance navigating from the proximal end of the blade (e.g., a location at which the blade is coupled to the rotor hub) to the blade's tip (e.g., distal end), for instance using the length of the blade. The UAV can then navigate from the tip back to the proximal end, and perform a similar inspection of a subsequent blade. After all the blades have been inspected, the UAV can navigate to a landing location.

For any inspection pattern, the UAV can determine a linear direction/linear orientation (e.g., in a 3D coordinate system) of a blade from a proximal end to a distal end, or vice-versa, of the blade. That is, as described above the UAV can track the leading edge as it navigates from the proximate to distal end, and can determine the linear direction (e.g., a vector indicating the direction of the blade, which can inform the orientation) based on movements of the UAV (e.g., determined from an INS, GNSS receiver, and so on). Additionally, the UAV can utilize dynamic edge or object detection to track the blade while moving. The UAV can determine multitudes of geo-spatial locations on the blade, and compute lines between the locations to determine the linear orientation. Furthermore, the UAV can utilize a geo-rectified model of the wind turbine to determine its precise location in space. The model can be manipulated by the UAV, or user device, to cause the blades of the model to be oriented according to the wind turbine being inspected. For instance, the model can updated once the UAV determines the orientation (e.g., as described below with respect to FIG. 2A-2E), or the model can be updated as the UAV learns the orientation online.

The flight plan received by the UAV can include one or more predefined flight path segments, for instance portions 18A-18C, and also one or more dynamic flight path segments, that can be associated with inspecting the blades along a first or second direction (e.g., towards a distal or proximal end). As an example, the pre-defined flight path segments can cause the UAV to navigate to the wind turbine 16, and the dynamic flight path segments can be associated with the UAV navigating along one or more the blades (e.g., selecting a next blade to navigate, navigating along the length, and so on).

Optionally, the UAV can receive an initial guess (e.g., by an operator, or from one or more images of the wind turbine as the UAV navigates towards the wind turbine) of the orientation of the blades. For instance, utilizing the user interface 500 described below in FIG. 5, the operator can indicate the orientation of the blades that looks closest to what he/she sees. The UAV can then navigate to a proximal or distal end of a blade (e.g., using dynamic edge/object detection, and the guessed orientation to roughly identify a location in space that the proximal or distal end should be at), and can navigate along the blade. While navigating the UAV can correct its position as described a, and determine an updated orientation based on movement information of the UAV, or by using its camera to monitor points and compute a line between the monitored points.

Figure 2A:
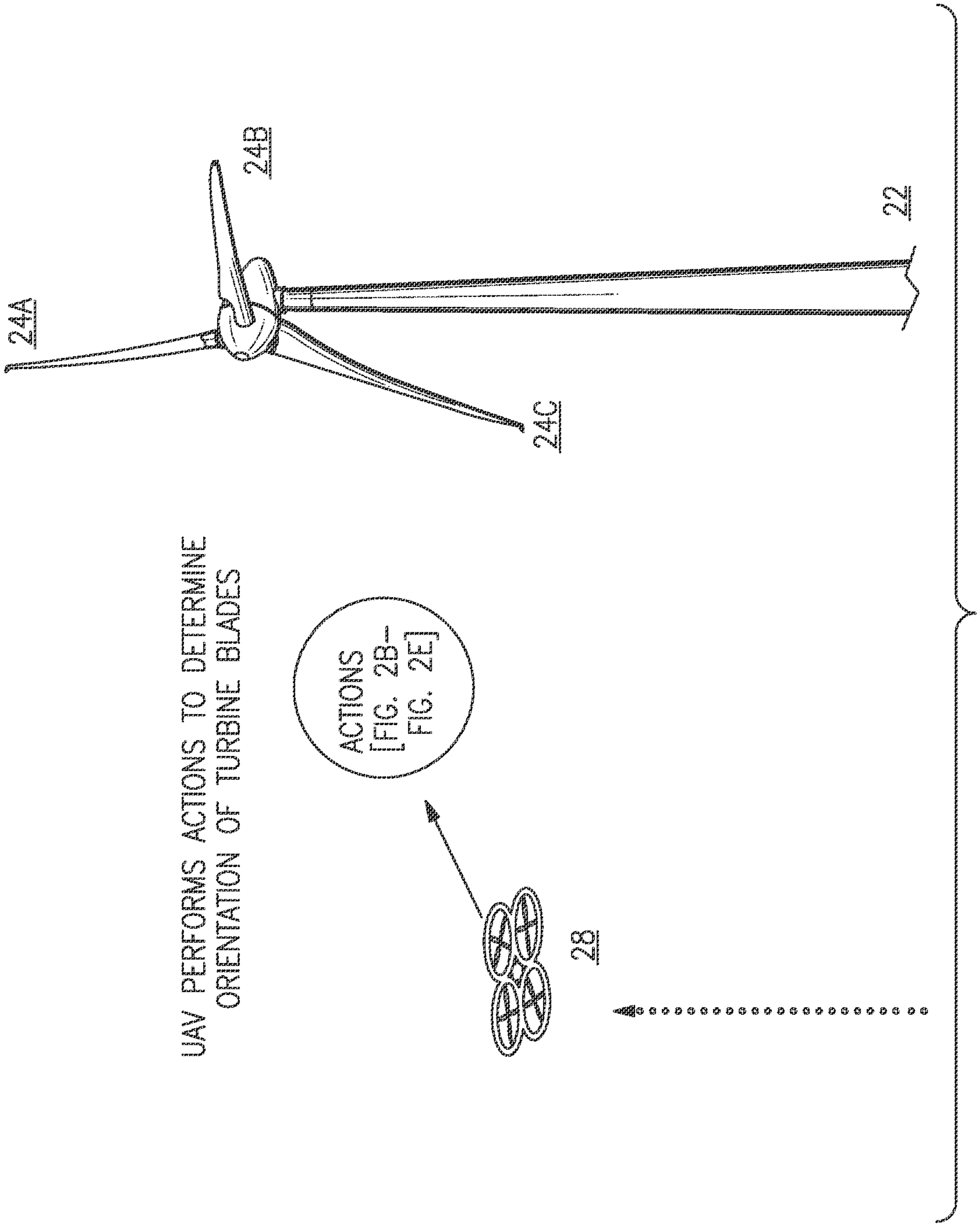
FIG. 2A illustrates a UAV determining an orientation of a wind turbine's blades.

FIG. 2A illustrates a UAV 20 determining an orientation of a wind turbine's 22 blades (e.g., blades 24A-24C). As described above, the UAV 20 can determine the orientation of the blades for use in subsequently performing an inspection of the wind turbine 22. That is, the UAV 20 can determine a particular flight pattern that will enable the UAV 20 to navigate along each of the blades 24A-24C and obtain images of the blades 24A-24C.

As will be described below, with respect to FIGS. 2B-2E, the UAV 20 can ascend from a take-off location, and perform one or more actions to determine the orientation of the blades 24A-24C. Additionally, as described above, optionally the UAV 20 can receive information indicating the orientation and can skip the orientation determination step. The UAV 20 can optionally utilize geometry information of the wind turbine 22 to determine the orientation, with the geometry information specifying physical characteristics, aspects, of the wind turbine 22 such as a number of blades, lengths of the blades, heights of one or more aspects of the wind turbine 22 (e.g., height of the wind turbine 22 absent the blades, height of a rotor hub, and so on).

Figure 2B:
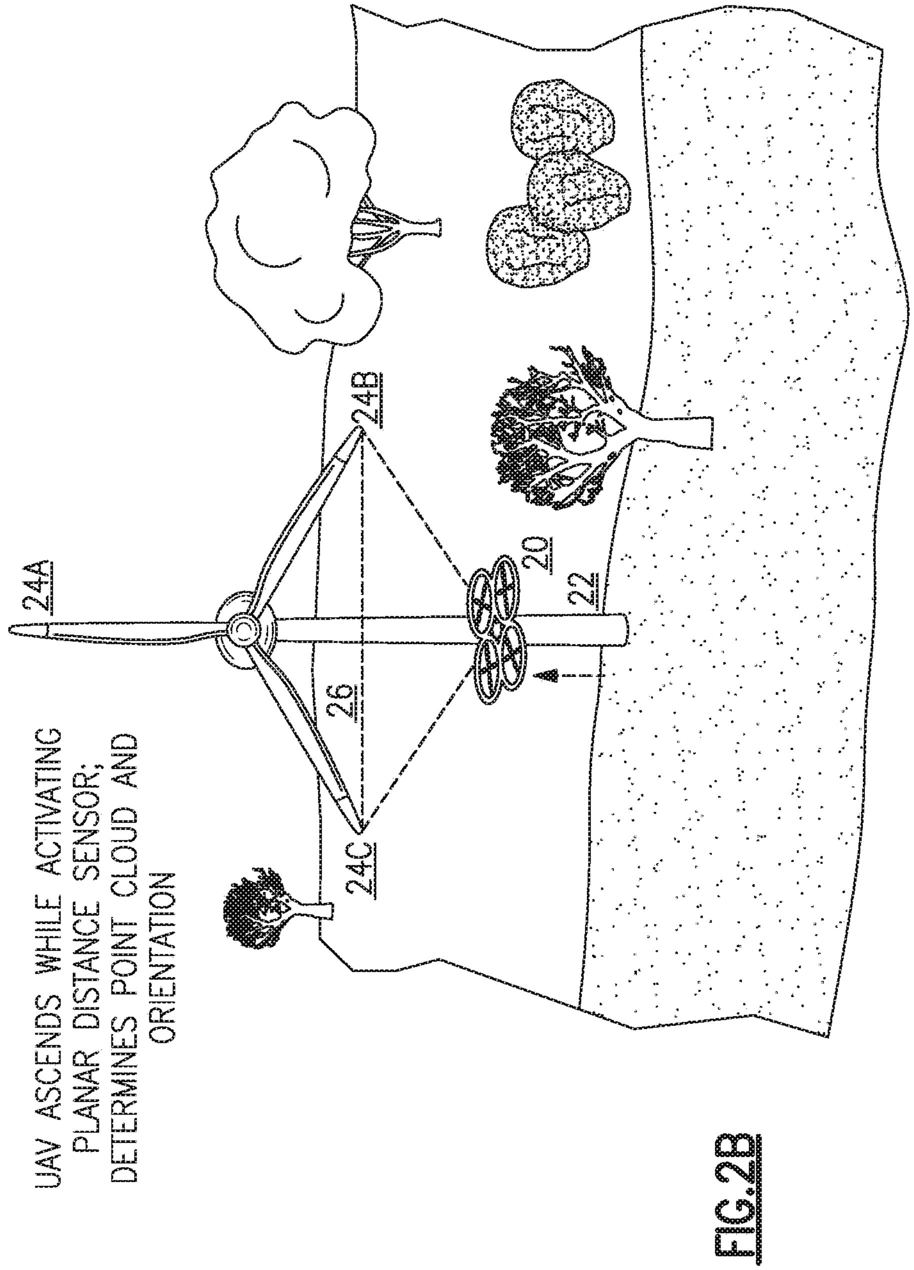
FIG. 2B illustrates a first example of the UAV determining an orientation of the blades.

FIG. 2B illustrates a first example of the UAV 20 determining an orientation of the blades 24A-24C. In the example of FIG. 2B, the UAV 20 is utilizing a planar distance sensor to accurately determine distances of objects from the UAV 20 along a particular line (e.g., line 26) extending from the planar distance sensor. A planar distance sensor can include a planar laser sensor, such as planar Lidar, a stereo camera (e.g., distances of objects included in images obtained by the stereo camera can be estimated), sonar, and so on. As will be described, the planar distance sensor can be utilized to generate a point cloud of the wind turbine 22, and from the point cloud, an orientation of the blades 24A-24C can be determined. Additionally, a pitch angle (e.g., angle of attack) associated with each blade can be determined using the point cloud. Since the flight plan to conduct an inspection of the wind turbine can involve the UAV 20 navigating along a leading edge of each blade, the pitch angle can inform the UAV's 20 trajectory.

As illustrated in FIG. 2B, the UAV 20 is ascending vertically upwards from a take-off location, and is activating the planar distance sensor. Optionally, the UAV 20 can be set at a horizontal distance from the wind turbine 22, such that the UAV 20 can obtain distance measurements along line 26 that extends horizontal end-to-end of the wind turbine 22. Alternatively, if the planar distance sensor needs to be located closer to objects being measured (e.g., the planar distance sensor requires that objects be within a threshold distance to accurately determine distance), the UAV 20 can first ascend from a horizontal position located near a horizontal end of the wind turbine, and subsequently ascend from horizontal positions located horizontally towards the other end of the wind turbine. In this way, the UAV 20 can separate portions of the wind turbine 22, and obtain planar distance sensor measurements for the entirety of the wind turbine 22 (e.g., the entirety of the wind turbine 22 facing the UAV 20).

The UAV 20 ascends vertically from the take-off location to a particular threshold distance above the take-off location while activating the planar distance sensor. The UAV 20 can utilize geometry information of the wind turbine 20 to identify a height of the wind turbine 22 (e.g., a height of the wind turbine 22 excluding the blades 24A-24C), and can ascend to the height of the wind turbine 22. Since the blades 24A-24C extend from the rotor hub, if the UAV 20 ascends to height of the wind turbine 22 it will necessarily obtain distance measurements of at least a portion of all three blades. For instance, if the UAV 20 ascends to the top of the wind turbine, the UAV 20 will obtain a beginning portion of blade 24A pointing vertically upwards in the example of FIG. 2B.

Optionally, the UAV 20 can ascend until an altitude at which at least a portion of one or more blades is guaranteed to be measurable by the planar distance sensor. For example, regardless of the orientation of the three blades 24A-24C, the highest altitude at which the blades (e.g., tips of the blades) can be located is the orientation in which the blades are angled at 0, 120, 240, degrees. Utilizing geometry information of the wind turbine 22, the UAV 20 can determine that portions of the blades will have to exist at a particular altitude regardless of the orientation of the blades 24A-24C. The UAV 20 can utilize a length of each blade, and a height associated with the rotor hub, to determine a lowest altitude that the UAV 20 can ascend (e.g., an offset can be applied to the lowest altitude to correct for any inconsistency, such as the blades connecting higher on the rotor hub than expected). Thus, the UAV 20 can ascend to the determined altitude, or a threshold distance above the determined altitude, and obtain planar distance measurements of the wind turbine 22.

The UAV 20, or optionally a user device in wired or wireless communication with the UAV 20, can utilize the measurements obtained from the planar distance sensor to generate a point cloud of the wind turbine 22. Since the point cloud will accurately describe the shape of the wind turbine 22, the orientation of the blades can be accurately determined.

As a first example of utilizing the generated point cloud, if the UAV 20 ascended to a height of the wind turbine 22, and thus obtained distance measurements to the top of the wind turbine 22, at least a portion of all of the blades 24A-24C of the wind turbine 22 would be included in the generated point cloud. The particular angle of each blade with respect to a reference point (e.g., a centroid of the rotor hub about which the blades 24A-24C rotate) can thus be accurately determined. Additionally, the pitch angle of each blade can be similarly determined (e.g., the point cloud will accurately describe the shape of each blade, including an angle of the leading edge with respect to wind affecting the leading edge).

As a second example, if the UAV 20 ascended to at least a determined height at which at least a portion of one or more blades is guaranteed to be located, then the generated point cloud would include the support structure and, in the example of FIG. 2B, at least two blades (e.g., blades 24B-24C). The same logic can be applied to wind turbines that utilize other numbers of blades. Since the number of blades is known (e.g., the UAV 20 can receive geometry information, and/or the UAV can obtain an image of the wind turbine 22 and identify the number of blades), the offset between each blade can be determined (e.g., the offset of each blade would be 360/n, where n is the number of blades). Thus, the orientation of all of the blades can be determined. That is, even though one blade may not be included in the generated point cloud (e.g., blade 24A), the orientation of the one blade can be determined from the orientations of the remaining blades (e.g., blades 24B-24C). The orientation of the remaining blades can be determined, for instance, based on a length of each blade (e.g., a length from the rotor hub to the tip of the blade).

For example, if the generated point cloud includes the tips of the blades (e.g., blades 24B-24C), a location at which each of the blades terminates (e.g., connects to the rotor hub) can be determined from the length of the blades (e.g., the tip can be projected in space to the length of the blade). If the length of each blade indicates a length from the rotor hub to the tip of the blade, then the UAV 20 can determine a size of the rotor hub (e.g., the distance from a location at which blade 24A connects to the rotor hub to a location at which blade 24B connects to the rotor hub can be determined, which can be used to determine dimensions of the rotor hub). Therefore, the UAV 20 can determine a location at which the remaining blade (e.g., 24C) connects to the rotor hub, and an orientation of the remaining blade (e.g., based on the blades being a same angle apart). In this way, the UAV 20 can effectively reconstruct the structure of the wind turbine 22 as if the UAV 20 had ascended to the top of the wind turbine 22 and obtained distance measurements of at least a portion of all the blades and the rotor hub as described above.

Optionally, the generated point cloud can be scaled according to geometry information of the wind turbine 22. For instance, the lengths of the blades, height of the wind turbine 22, heights of one or more portions (e.g., a height of the rotor hub), and so on, can be utilized to provide a scale to the point cloud. In this way, the UAV 20 can accurately determine dimensions of the wind turbine 22, which can be utilized when generating a subsequent flight plan to perform an inspection of the wind turbine 22. The generated point cloud can be stored and utilized in subsequent flight plans to inspect the wind turbine 22, for instance the point cloud can be utilized as accurate geometry information of the wind turbine 22.

Figure 2C:
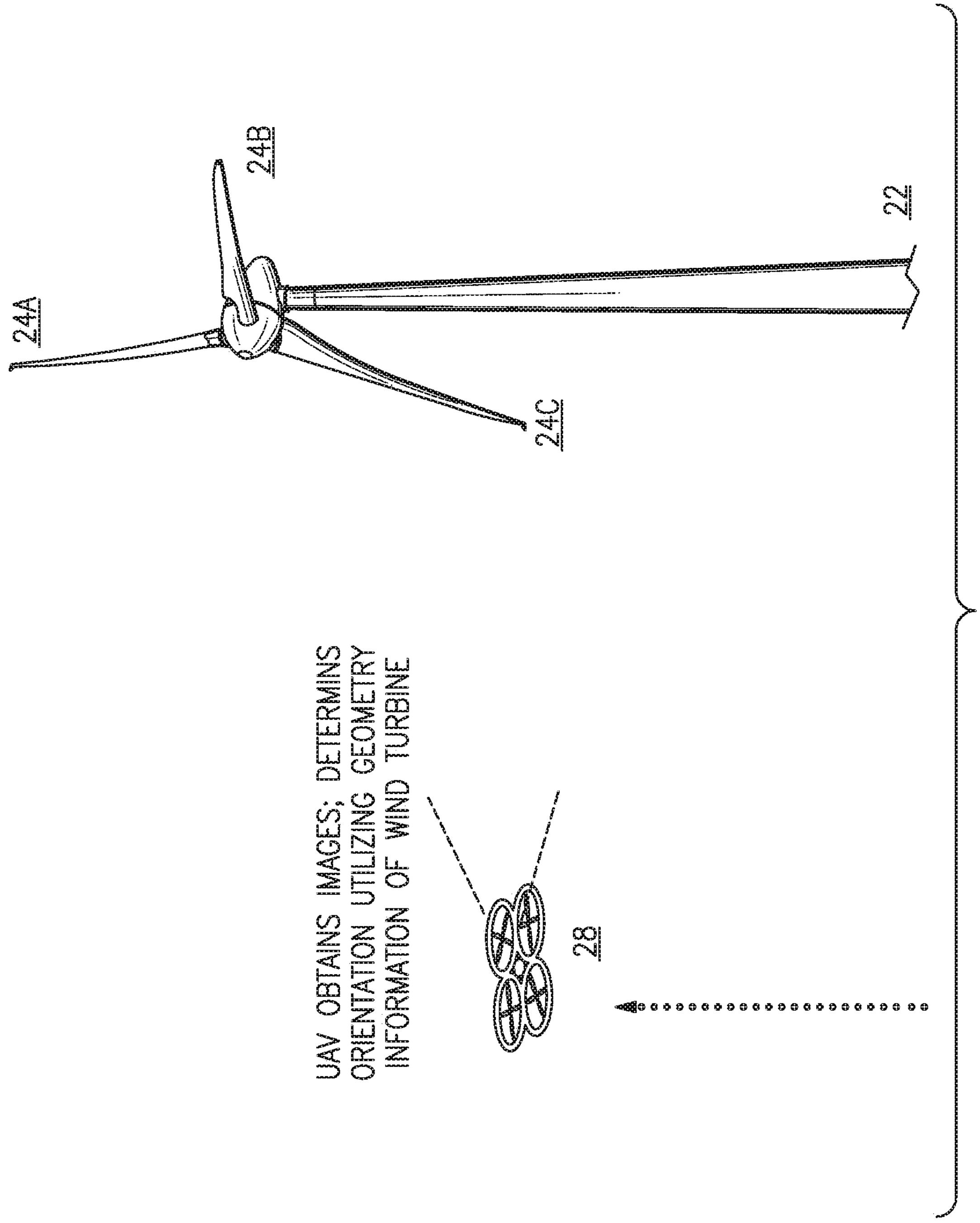
FIG. 2C illustrates a second example of the UAV determining an orientation of the blades.

FIG. 2C illustrates a second example of the UAV 20 determining an orientation of the blades 24A-24C. In the example of FIG. 2C, the UAV 20 is utilizing a camera (e.g., single camera or a stereo camera) in combination with geometry information of the wind turbine, to determine the orientation. As will be described, the UAV 20 can obtain an image of the wind turbine 20, and determine an accurate pose of the camera, which in this specification indicates a position and orientation of the camera. The UAV 20 can then utilize geometry information of the wind turbine 20, such as a location of the wind turbine (e.g., a location of a centroid of the support structure), a height of each blade, a height of the wind turbine 22, and so on, and based on the pose information, determine an accurate orientation of the blades 24A-24C.

As illustrated, the UAV 20 is ascending from a particular horizontal position (e.g., a take-off location) to a threshold altitude above the particular horizontal position while obtaining one or more images using the camera. The take-off location can be set such that the UAV 20, upon ascending to the threshold altitude, can obtain images of the entirety of the wind turbine 22 or images of the rotor hub and at least a portion of each blade (e.g., blades 24A-24C).

The UAV 20 can determine a pose associated with each image of the wind turbine 22, for instance the UAV 20 can accurately record its altitude (e.g., the UAV 20 can utilize a distance sensor pointing to the ground, or the UAV 20 can determine accurate GNSS coordinates indicating an altitude), and based on the particular horizontal position, can determine a three-dimensional location in space of the UAV 20. The UAV 20 can then determine an offset of the UAV with respect to the camera, such as an offset from a distance sensor, an offset from a GNSS receiver, and so on, and can then determine an orientation of the camera. Optionally, the camera orientation can be fixed to the UAV 20, and the UAV 20 can utilize inertial navigation system (INS) information to determine its orientation. Optionally, the camera orientation can be maneuverable (e.g., through use a gimbal) with respect to the UAV 20, and the UAV 20 can determine an orientation of the camera (e.g., orientation of the gimbal) with respect to the UAV's 20 orientation. This position and orientation information can be determined for each image of the wind turbine 22.

The UAV 20 can then determine an orientation of the blades 24A-24C of the wind turbine 22 utilizing the images and associated determined poses, and geometry information of the wind turbine 20. For instance, based on a field of view of the camera (e.g., a sensor resolution, focal length, and so on), the UAV 20 can determine a mapping between image pixels and a real-world measurement of the wind turbine (e.g., based on geometry information). As an example, if an image includes blade 24C, the UAV 20 can utilize a length of the blade 24C (e.g., indicated in received geometry information) to determine a length of each image pixel of the blade 24C with respect to the real-world blade 24C.

In this way, the UAV 20 can map portions of the wind turbine 22 included in each image, onto the geometry information, to obtain a representation of the wind turbine 22. Since the pose of the camera is known (e.g., as described above), the location of the camera with respect to the wind turbine 22 as included in each image can be determined. The UAV 20 can then determine an orientation of the blades 24-24C utilizing the location of the camera, and mapping of the blades 24A-24C as imaged onto the geometry information. For example with a first image that includes the blades and the support structure, the UAV 20 can (1) determine its location in space when the first image was obtained and optionally obtain a location of wind turbine 22 (e.g., a centroid of the support structure), and (2) determine a field of view that would be seen by the UAV 20 when located at the determined location with respect to the location of the wind turbine 22 (e.g., based on information associated with the camera, such as a focal length, sensor size and resolution). The UAV 20 can then utilize the geometry information indicating a length of each blade to determine, effectively, a model of the wind turbine 22 that includes the blades 24A-24C placed onto the model. From this model, the UAV 20 can determine an orientation of the blades 24A-24C.

Alternatively, the UAV can utilize geometry information of the wind turbine, to determine the pose associated with each image, and then using the pose, can determine the orientation of the blades 24A-24C. For example with a first image that includes the blades and the support structure, the UAV 20 can (1) identify the blades (e.g., using one or more computer vision processes) and determine a size of the blades in image pixel space, (2) back out the pose of the camera from the size of the blades in image pixel space, along with the field of view included in the image (e.g., determined from camera information as described above) using geometry information, such as one or more of the length of the blades, location of the wind turbine 22, height of the wind turbine 22, and (3) determine an orientation of the blades based on the pose of the camera.

That is, the UAV 20 can determine a pose associated with each image (e.g., empirically using its location and orientation information), or the UAV 20 can determine a pose associated with each image based on the image and geometry information of the wind turbine 22. In either scenario, the UAV 20 can determine an orientation of the blades 24A-24C.

Figure 2D:
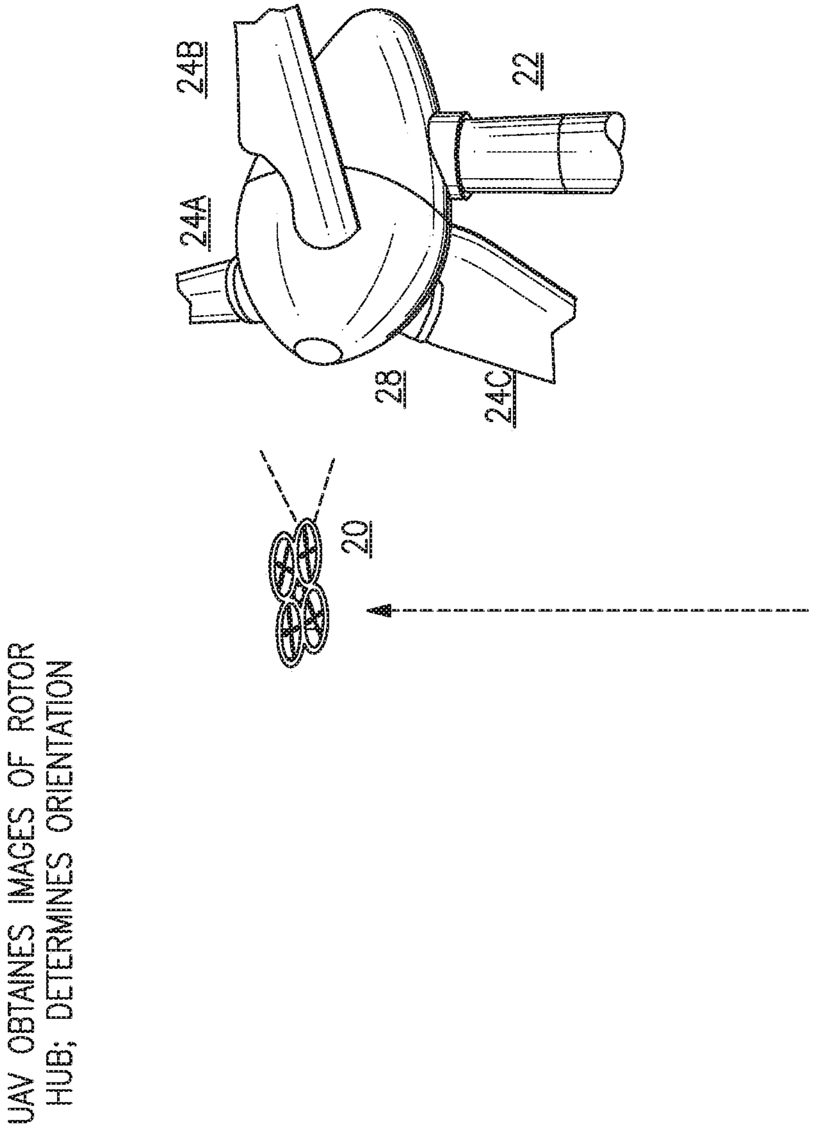
FIG. 2D illustrates a third example of the UAV determining an orientation of the blades.

FIG. 2D illustrates a third example of the UAV 20 determining an orientation of the blades 24A-24C. The example of FIG. 2D illustrates the UAV 20 obtaining images of the rotor hub 28 of the wind turbine 20. Since the rotor hub 28 includes connections to each of the blades 24A-24C, the orientation of the blades can be quickly determined based on obtained images of the rotor hub 28.

As illustrated in the example, the UAV 20 has ascended to a particular altitude at which the rotor hub 28 of the wind turbine 22 is visible to a camera of the UAV 20 (e.g., a centroid of the rotor hub 28). The UAV 20 is at a particular horizontal distance from the rotor hub that will allow the UAV 20 to obtain detailed images of the rotor hub, such that a point cloud of the rotor hub 28 can be generated (e.g., using photogrammetry software). The UAV 20 obtains images of a portion of each blade and the rotor hub 28. After obtaining the images, the UAV 20 can generate a point cloud from the images, and the orientation of each blade can be determined (e.g., as described above with respect to FIG. 2B). That is, the angle of each blade with respect to a particular reference point (e.g., a top of the rotor hub) can be quickly determined from the point cloud. Similarly, a pitch angle can be determined from the point cloud (e.g., as described above with respect to FIG. 2B). Optionally, the UAV 20 can obtain images of a portion of a single blade (e.g., blade 24A) and the rotor hub, and can determine the orientation of the remaining blades based on the number of blades utilized by the wind turbine 22. For instance, if there are three blades (e.g., as illustrated), the UAV 20 can determine offsets from the single blade (e.g., 24A) based on the assumption that the blades are equally spaced from each other (e.g., 120 degrees apart).

Figure 2E:
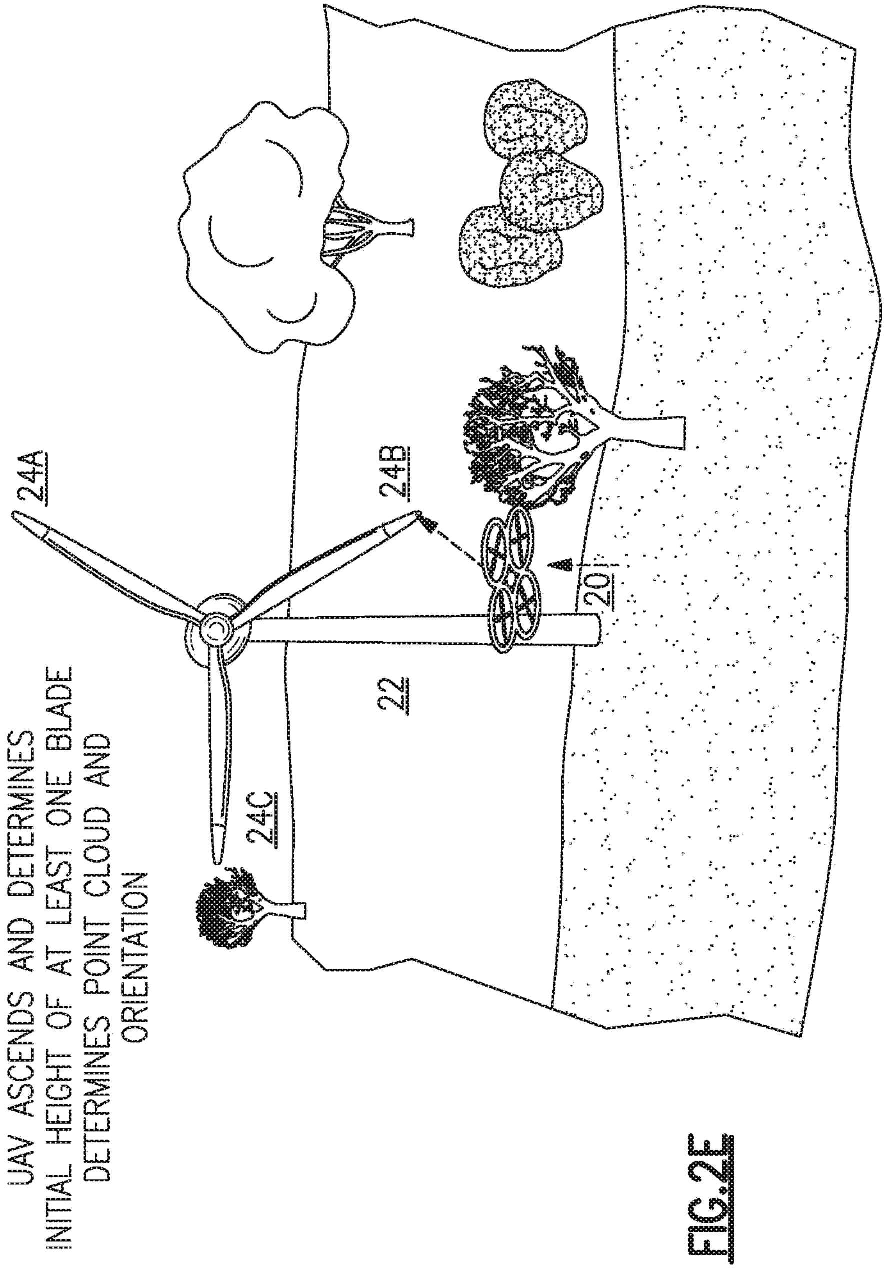
FIG. 2E illustrates a fourth example of the UAV determining an orientation of the blades.

FIG. 2E illustrates a fourth example of the UAV 20 determining an orientation of the blades 24A-24C. The example of FIG. 2E illustrates the UAV determining an initial altitude at which any of the blades 24A-24C are located (e.g., a lowest height of any portion of a blade, such as a tip of the blade). Since each of the blades 24A-24C are set a same distance from each other (e.g., a same angle about the rotor hub), utilizing information indicating a length of each blade, the orientation of the blades 24A-24C can be determined.

As illustrated in the example, the UAV 20 is ascending upwards from a particular location (e.g., a take-off location) a horizontal distance from the wind turbine 22. Additionally, the UAV 20 is set such that the UAV 20 is in line with a tip of blade 24B (e.g., substantially in line, such as a threshold horizontal distance away from a line extending from the tip of blade 24B). The operator can view the wind turbine 22, and determine a blade that appears to be the closest to a surface on which the wind turbine 22 sits (e.g., the ground), and can place the UAV in line with the blade (e.g. blade 24B as illustrated). Optionally, the operator can place the UAV in line with any portion of the wind turbine (e.g., the support structure, any of the blades).

The UAV 20 ascends from the particular location, and obtains images of the wind turbine 22 while ascending. The UAV 20 determines an altitude at which a horizontal center (e.g., a horizontal line at the center of the camera) of a field of view of a camera of the UAV 20 includes a lowest portion of any blade (e.g., a tip of blade 24B can be recognized using computer vision processes). The UAV can then utilize a distance sensor to accurately determine its altitude, or can optionally utilize a GNSS receiver to determine its altitude. To ensure that the determined altitude correctly corresponds to a lowest portion of the blade (e.g., blade 24B), optionally the UAV can project electromagnetic radiation (e.g., a laser) of a particular wavelength onto the blade, and utilize a sensor (e.g., a camera) configured to detect electromagnetic radiation of that wavelength to determine that the blade is being hit with the radiation. The UAV 20 can then determine an offset from a distance sensor measuring altitude of the UAV (e.g., a Lidar, sonar, sensor measuring distance to the ground, or a GNSS receiver) to the center of the camera or center of the device projecting electromagnetic radiation, and accurately determine a height at which the blade is visible.

Similarly, the UAV can obtain an image of the blade that includes a tip of the blade, and accurately determine its altitude when the image was taken. For instance, a center of a field of view of the camera (e.g., a horizontal line through the center) can be a threshold distance above the tip of the blade. The UAV 20 can also project electromagnetic radiation, and determine the UAV's 20 altitude along with a location on the blade that the radiation struck (e.g., a point on the blade).

The UAV 20 can then utilize geometry information associated with the wind turbine 22, such as a length of the blades and height of the rotor hub, to determine the orientation of the blades 24A-24C. That is, if the UAV 20 obtained an image in which a center of a field of view of the image included a lowest portion of a blade (e.g., blade 24B), the UAV 20 can utilize geometry information (e.g., a length of the blade) and a height at which the image was taken, to determine an angle of the blade. That is, the UAV 20 can determine that, if it sees that the tip of the blade is located a particular distance above the ground, for that particular distance to occur, the blade must be at a particular orientation (e.g., based on a height at which the blade connects to the wind turbine). The UAV 20 can then estimate the orientations of the remaining blades (e.g., in the example there are three blades, and so the remaining blades are 120 degrees offset).

Since ensuring that a center of a field of view of the camera includes a lowest portion of a blade can be difficult, the UAV can utilize an image that merely includes the lowest portion of the blade. Since the UAV is set at a particular horizontal distance from the wind turbine 22, the UAV 22 can utilize the length of the blade, to determine a real-world size associated with each image pixel of the blade (e.g., based on camera information, such as a focal length of a lens, sensor size and resolution). The UAV 20 can then utilize the center of the field of view of the camera, or a precise location of projected electromagnetic radiation on the blade, to determine a location on the blade that corresponds to the determined altitude at which the image was obtained, or the radiation was projected. The UAV 20 can then determine scale information of the blade (e.g., determined from the length, horizontal distance, camera information), to determine an altitude that the tip of the blade is at. Using the altitude of the tip, the UAV 20 can then determine the orientation as described above.

FIGS. 2A-2E described examples of a UAV determining an orientation of the blades of a wind turbine that is to be inspected. Additional methods and examples of determining the orientation can be utilized. For instance, an operator associated with the inspection can measure the orientation (e.g., measure an angle of each blade with respect to a particular reference point, such as the top of the rotor hub), or can obtain the orientation from an entity associated with the wind turbine (e.g., the wind turbine can include a sensor that measures the current rotation state of the blades, and the entity can obtain the rotation state and provide it to the operator).

Once the orientation of the blades are known, the UAV can perform an inspection of the wind turbine. Optionally, the UAV can receive the orientation and not perform any method of determining the orientation. Optionally, the UAV can determine the orientation while inspecting the wind turbine (e.g., online during the inspection), as described above with respect to FIG. 1A.

Figure 3:
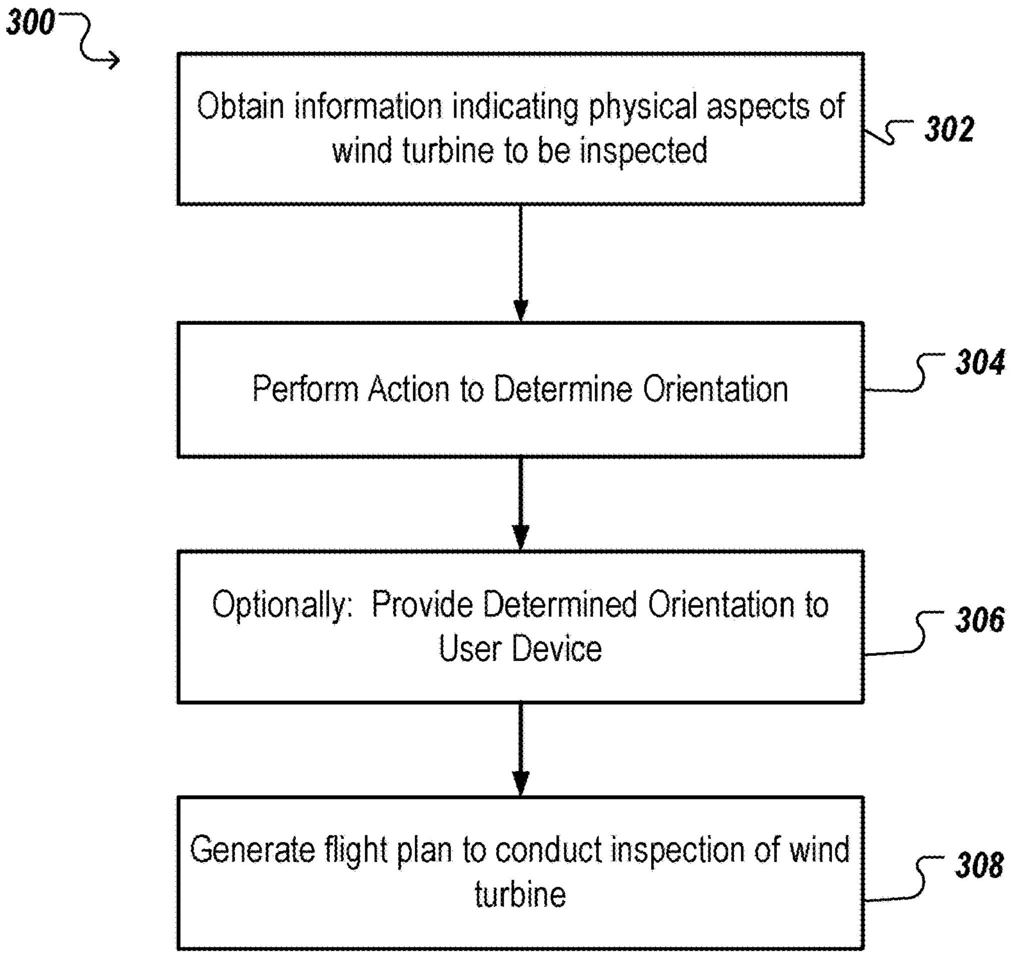
FIG. 3 illustrates an example process of generating a flight plan to conduct an inspection of a wind turbine.

FIG. 3 illustrates an example process 300 of generating a flight plan to conduct an inspection of a wind turbine. For convenience, the example process will be described as being performed by an unmanned aerial vehicle (UAV) comprising one or more processors (e.g., a UAV implementing the UAV primary processing system 400 described in FIG. 4).

The UAV obtains information indicating physical aspects of the wind turbine to be inspected (block 302). As described above, the UAV can obtain geometry information of the wind turbine, which can include a location of the wind turbine, a number of blades, a length of the blades, a height of the wind turbine (e.g., a height excluding the blades), a height of one or more portions of the wind turbine (e.g., a height of the rotor hub, a height of the nacelle, and so on).

The UAV performs an action to determine an orientation of the wind turbine (e.g., block 304). As described in FIGS. 2A-2E above, the UAV can ascend and perform one or more actions to determine the orientation.

The UAV optionally provides the determined orientation to a user device (block 306). As described above the UAV can be in wired or wireless communication with a user device of an operator located proximate to the wind turbine. The user device can receive the determined orientation information, and utilize the information to generate a subsequent flight plan to perform an inspection of the wind turbine. Optionally, the user device can receive images and sensor information (e.g., planar distance sensor) obtained during block 304, and can determine the orientation of the wind turbine. The user device can then generate the flight plan based on the determined orientation.

The UAV generates a flight plan to conduct an inspection of the wind turbine (block 308). Utilizing the determined orientation and geometry information of the wind turbine, the UAV can generate a flight plan that enables the UAV to inspect the wind turbine. The flight plan can optionally be limited (e.g., by a user, or by the operator described above) as being limited to particular portions of the wind turbine, such as one or more of the nacelle, the rotor hub, the blades, or portions of the blades (e.g., the leading edges). The UAV then performs the flight plan, as described above with respect to FIG. 1A.

Figure 5:
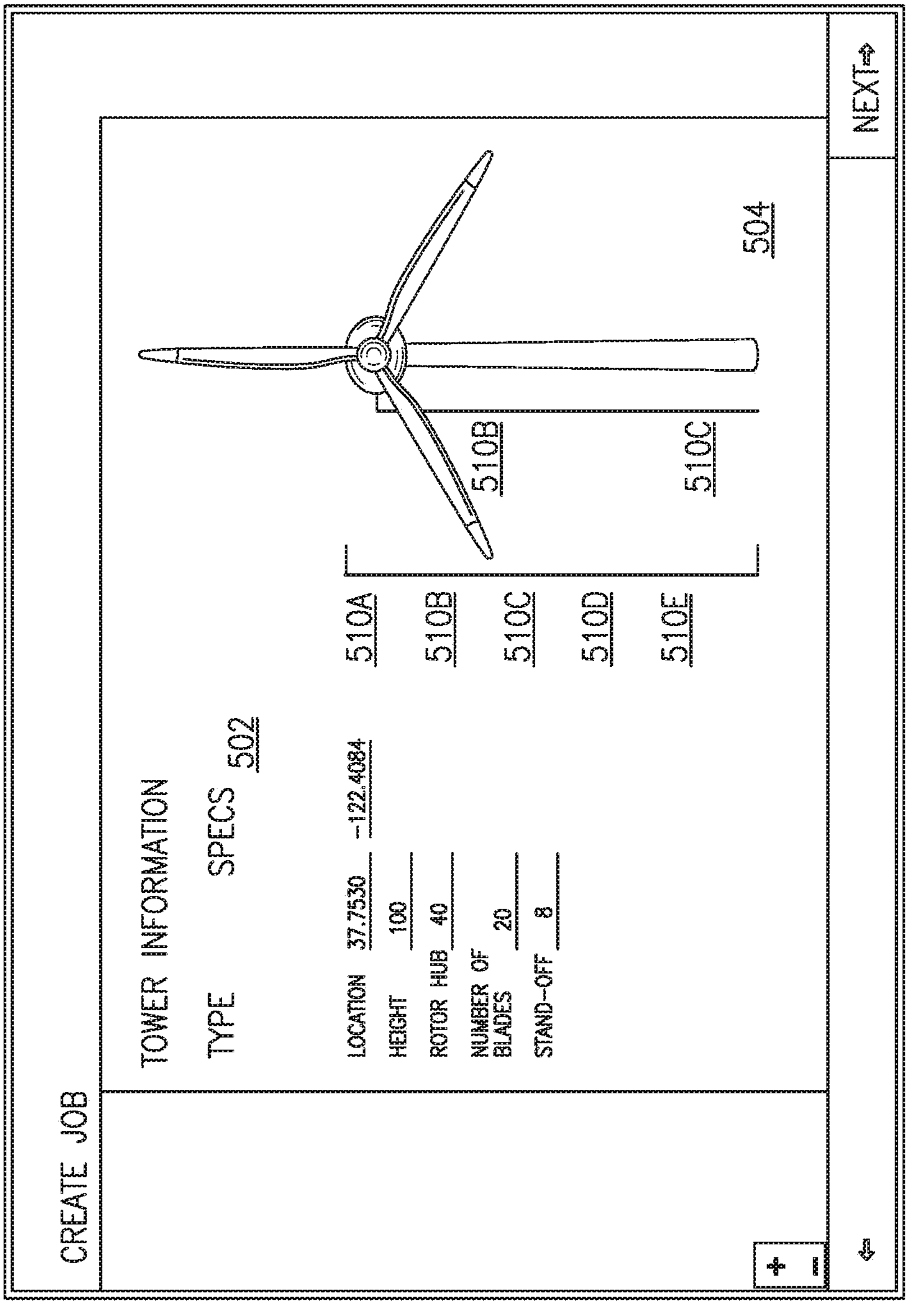
FIG. 5 illustrates an example user interface for specifying physical aspects of a wind turbine.

FIG. 5 illustrates an example user interface 500 for specifying physical aspects of a wind turbine. As described above, geometry information of a wind turbine can be utilized to determine an orientation of a wind turbine's blades and also to conduct an inspection of the wind turbine. A user of user interface 500 can specify values of parameters that describe physical aspects of a wind turbine, and can thus be used as the geometry information. The user interface 500 can be presented on a user device of an operator located proximate to a wind turbine to be inspected, and can be utilized by a user of a server system associated with assigning operators to perform inspections of wind turbines.

The user interface 500 can present representations of types of wind turbines, for instance wind turbines of varying numbers of blades, or horizontal, vertical, axis turbines, and so on. The user of the user interface can select a type associated with a wind turbine that is to be inspected, and a larger representation 504 of the selected type can be presented (e.g., a horizontal, three blade, wind turbine as illustrated).

The user interface 500 includes parameters 502 each associated with a physical aspect of a wind turbine that is to be inspected. Upon any interaction with a parameter, the representation 504 of the wind turbine can be updated to identify a physical aspect that is being described by the parameter. For instance, upon interaction with a height parameter, the representation 504 can highlight, color, or otherwise identify, the height of the wind turbine (e.g., excluding blades). The parameters include a location (e.g., a centroid of the wind turbine, a centroid of a support structure of the wind turbine, such as a horizontal position associated with the centroids), a height of the wind turbine to be inspected, a height of a rotor hub (e.g., a height of a centroid of the rotor hub), a height at which each blade connects to the rotor hub, a number of blades, a stand-off distance (e.g., a ground sampling distance as described above), and so on.

Optionally, values of the parameters can be automatically populated from stored information associated with the wind turbine. For instance, information maintained in one or more databases associated with an entity that maintains, controls, regulates, the wind turbine. The user of the user interface 500 can then specify remaining values of the parameters.

UAV Block Diagram

Figure 4:
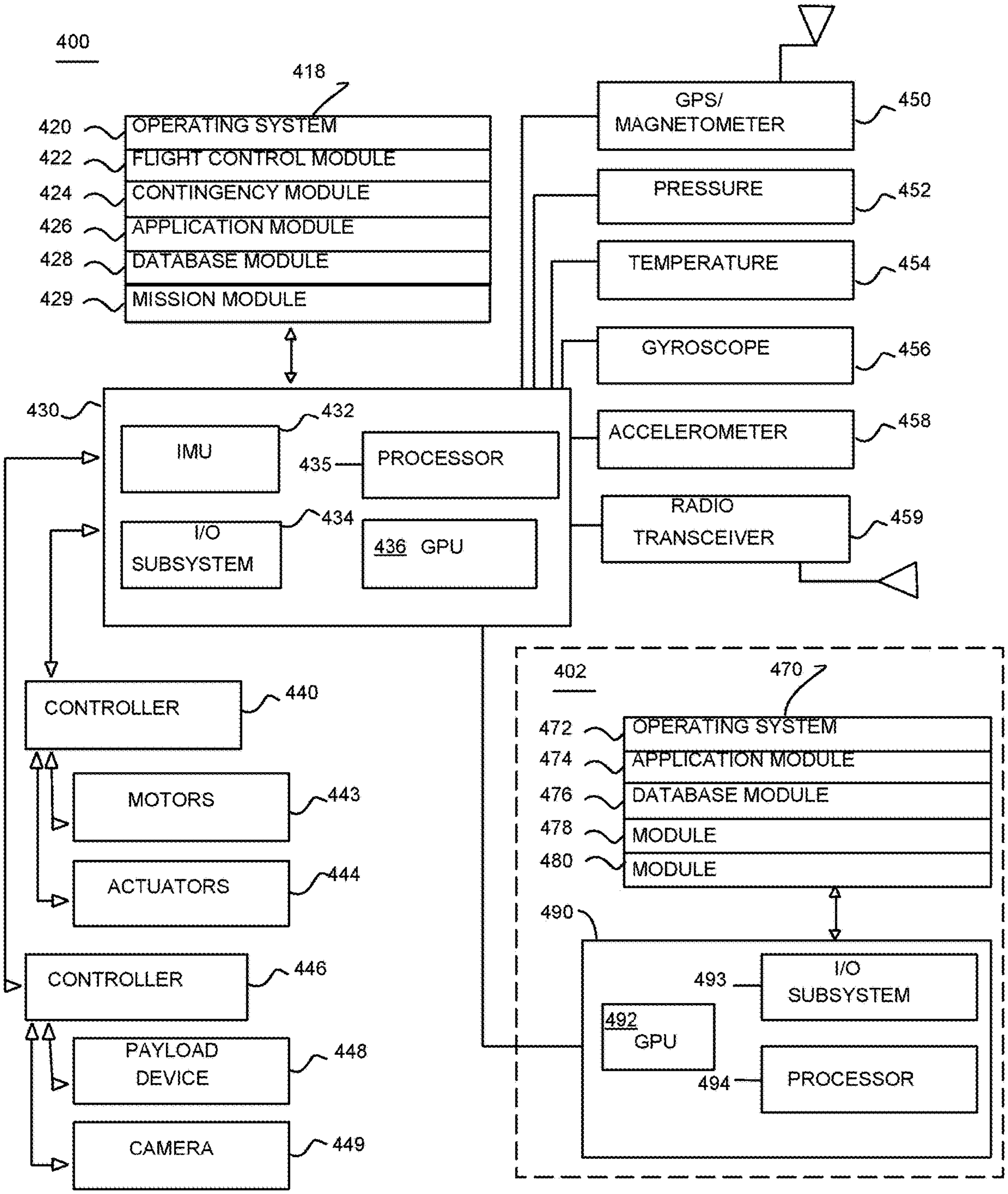
FIG. 4 illustrates a block diagram of an example Unmanned Aerial Vehicle (UAV) architecture for implementing the features and processes described herein.

FIG. 4 illustrates a block diagram of an example Unmanned Aerial Vehicle (UAV) architecture for implementing the features and processes described herein. A UAV primary processing system 400 can be a system of one or more computers, or software executing on a system of one or more computers, which is in communication with, or maintains, one or more databases. The UAV primary processing system 400 can be a system of one or more processors 435, graphics processors 436, I/O subsystem 434, logic circuits, analog circuits, associated volatile and/or non-volatile memory, associated input/output data ports, power ports, etc., and/or one or more software processing executing one or more processors or computers. Memory 418 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 450, gyroscopes 456, accelerometers 458, pressure sensors (static or differential) 452, current sensors, voltage sensors, magnetometer, hydrometer, and motor sensors. The UAV may use an inertial measurement unit (IMU) 432 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 400 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 422 handles flight control operations of the UAV. The module interacts with one or more controllers that control operation of motors 442 and/or actuators 444. For example, the motors may be used for rotation of propellers, and the actuators may be used for flight surface control such as ailerons, rudders, flaps, landing gear, and parachute deployment.

The contingency module 424 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 429 processes the flight plan, waypoints, and other associated information with the flight plan as provided to the UAV in the flight package. The mission module 429 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 449, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 418 of the UAV processing system 400.

The UAV processing system 400 may be coupled to various radios, and transmitters 459 for manual control of the UAV, and for wireless or wired data transmission to and from the UAV primary processing system 400, and optionally the UAV secondary processing system 402. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 420 can be a real time operating system (RTOS), UNIX, LINUX, OS X, WINDOWS, ANDROID or other operating system. Additionally, other software modules and applications may run on the operating system, such as a flight control module 1022, contingency module 1024, application module 1026, and database module 1028. Typically flight critical functions will be performed using the UAV processing system 1000. Operating system 1020 may include instructions for handling basic system services and for performing hardware dependent tasks.

In addition to the UAV primary processing system 400, a secondary processing system 1002 may be used to run another operating system to perform other functions. A UAV secondary processing system can be a system of one or more computers, or software executing on a system of one or more computers, which is in communication with, or maintains, one or more databases. The UAV secondary processing system 402 can be a system of one or more processors 494, graphics processors 492, I/O subsystem 494 logic circuits, analog circuits, associated volatile and/or non-volatile memory, associated input/output data ports, power ports, etc., and/or one or more software processing executing one or more processors or computers. Memory 470 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 402 will be non-critical functions in nature, that is if the function fails, the UAV will still be able to safely operate. In some implementations, the operating system 472 can be based on real time operating system (RTOS), UNIX, LINUX, OS X, WINDOWS, ANDROID or other operating system. Additionally, other software modules and applications may run on the operating system 472, such as an application module 474, database module 476. Operating system 402 may include instructions for handling basic system services and for performing hardware dependent tasks.

Also, controllers 446 may be used to interact and operate a payload device 448, and other devices such as photographic camera 449, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 402 may have coupled controllers to control payload devices.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising one or more processors and one or more computer storage media storing instructions that, when executed by the one or more processors, cause the one or more processors to perform operations comprising:

obtaining first sensor information by an unmanned aerial vehicle (UAV), the first sensor information describing physical aspects of a wind turbine, including one or more blades of the wind turbine;

determining an orientation of the blades of the wind turbine based on the obtained first sensor information;

determining a flight pattern for the UAV to inspect the blades of the wind turbine, wherein the flight pattern is based on the determined orientation of the blades and comprises a plurality of blade-specific traversal segments, each traversal segment associated with a respective blade and corresponding to sequential traversal of the blades based on the determined orientation and defining a relative pose of the UAV with respect to the respective blade including at least one of (i) a standoff distance, (ii) a viewing angle relative to a blade edge, or (iii) a position along a span of the blade with respect to a feature of the blade including at least one of a leading edge, trailing edge, or blade surface region; and inspecting by the UAV, each of the blades of the wind turbine according to the determined flight pattern, wherein inspecting comprises obtaining second sensor information describing the blades of the wind turbine while navigating the UAV according to the plurality of blade-specific traversal segments and maintaining the defined relative pose with respect to each respective blade during acquisition of the second sensor information such that the second sensor information is obtained from a consistent spatial relationship relative to the respective blade.

2. The system of claim 1, wherein the operation of determining an orientation of the blades comprises:

activating a distance sensor that measures distance from the UAV to the wind turbine, and storing measurements obtained from the distance sensor;

generating, from the stored measurements, a point cloud, the point cloud representing the wind turbine; and determining the orientation of the blades from the generated point cloud.

3. The system of claim 1, wherein the operation of determining an orientation of the blades comprises:

activating a camera coupled to the UAV, and obtaining at least one image of the wind turbine, including the one or more blades;

determining a pose of the camera for each obtained image based on the physical aspects of the wind turbine, the pose indicating at least a position and an orientation of the camera; and determining the orientation of the blades based on the determined poses and images of the wind turbine.

4. The system of claim 1, wherein the operation of determining an orientation of the blades comprises:

obtaining a plurality of images of a rotor hub of the wind turbine and a portion of at least one blade that connects to the rotor hub;

generating a point cloud based on the obtained images; and determining the orientation of the blades from the generated point cloud.

5. The system of claim 1, wherein the operation of inspecting each of the blades comprises at least:

navigating the UAV, via autopilot, along a first blade of the wind turbine from a first blade distal end to a first blade proximal end, the first blade proximal end coupled to a center blade hub of the wind turbine;

while navigating the UAV along the first blade maintaining a relative pose of the UAV with respect to the first blade including controlling a distance and orientation of the UAV relative to a surface of the first blade and periodically obtaining sensor information describing the first blade;

navigating the UAV, via autopilot, along a second blade from a second blade proximal end to a second blade distal end, the second blade proximal end coupled to the center blade hub of the wind turbine; and while navigating the UAV along the second blade maintaining a relative pose of the UAV with respect to the second blade including controlling a distance and orientation of the UAV relative to a surface of the second blade and periodically obtaining sensor information describing the second blade.

6. The system of claim 1, wherein the operation of inspecting each of the blades comprises at least:

navigating the UAV along a first blade for a fixed distance from a first blade proximal end to a first blade distal end, the fixed distance being a value indicating the length of the first blade.

7. The system of claim 1, wherein the operation of determining an orientation of blades comprises:

determining an orientation of blades connected to the wind turbine, the orientation specifying an angle of each blade with respect to a reference associated with the wind turbine, wherein the determined orientation is used to define the relative pose for each blade-specific traversal segment.

8. A method implemented by a system of one or more processors, the method comprising:

obtaining first sensor information by an unmanned aerial vehicle (UAV), the first sensor information describing physical aspects of a wind turbine, including one or more blades of the wind turbine;

determining an orientation of the blades of the wind turbine based on the obtained first sensor information;

determining a flight pattern for the UAV to inspect the blades of the wind turbine, wherein the flight pattern is based on the determined orientation of the blades and comprises a plurality of blade-specific traversal segments each defining a relative pose of the UAV with respect to a blade and corresponding to sequential traversal of the blades based on the determined orientation, the relative pose being defined with respect to a feature of the blade; and inspecting by the UAV, each of the blades of the wind turbine according to the determined flight pattern, wherein inspecting comprises obtaining second sensor information describing the blades of the wind turbine while navigating according to the blade-specific traversal segments and maintaining the relative pose during acquisition of the second sensor information such that the second sensor information is obtained from a consistent spatial relationship relative to the blade.

9. The method of claim 8, wherein determining an orientation of the blades comprises:

activating a distance sensor that measures distance from the UAV to the wind turbine, and storing measurements obtained from the distance sensor;

generating, from the stored measurements, a point cloud, the point cloud representing the wind turbine; and determining the orientation of the blades from the generated point cloud.

10. The method of claim 8, wherein determining an orientation of the blades comprises:

activating a camera coupled to the UAV, and obtaining at least one image of the wind turbine, including the one or more blades;

determining a pose of the camera for each obtained image based on the physical aspects of the wind turbine, the pose indicating at least a position and an orientation of the camera; and determining the orientation of the blades based on the determined poses and images of the wind turbine.

11. The method of claim 8, wherein determining an orientation of the blades comprises:

obtaining a plurality of images of a rotor hub of the wind turbine and a portion of at least one blade that connects to the rotor hub;

generating a point cloud based on the obtained images; and determining the orientation of the blades from the generated point cloud.

12. The method of claim 8, wherein inspecting each of the blades comprises at least:

navigating the UAV, via autopilot, along a first blade of the wind turbine from a first blade distal end to a first blade proximal end, the first blade proximal end coupled to a center blade hub of the wind turbine;

while navigating the UAV along the first blade maintaining a relative pose of the UAV with respect to the first blade including controlling a distance and orientation of the UAV relative to a surface of the first blade and periodically obtaining sensor information describing the first blade;

navigating the UAV, via autopilot, along a second blade from a second blade proximal end to a second blade distal end, the second blade proximal end coupled to the center blade hub of the wind turbine; and while navigating the UAV along the second blade maintaining a relative pose of the UAV with respect to the second blade including controlling a distance and orientation of the UAV relative to a surface of the second blade and periodically obtaining sensor information describing the second blade.

13. The method of claim 8, wherein inspecting each of the blades comprises at least:

navigating the UAV along a first blade for a fixed distance from a first blade proximal end to a first blade distal end, the fixed distance being a value indicating the length of the first blade.

14. The method of claim 8, wherein determining an orientation of blades comprises:

determining an orientation of blades connected to the wind turbine, the orientation specifying an angle of each blade with respect to a reference associated with the wind turbine.

15. Non-transitory computer storage media storing instructions that, when executed by a system of one or more processors, cause the one or more processors to perform operations comprising:

obtaining first sensor information by an unmanned aerial vehicle (UAV), the first sensor information describing physical aspects of a wind turbine, including one or more blades of the wind turbine;

determining an orientation of the blades of the wind turbine based on the obtained first sensor information;

determining a flight pattern for the UAV to inspect the blades of the wind turbine, wherein the flight pattern is based on the determined orientation of the blades and comprises blade-specific traversal segments each defining a relative pose of the UAV relative to a surface of a blade and corresponding to sequential traversal of the blades based on the determined orientation; and inspecting by the UAV, each of the blades of the wind turbine according to the determined flight pattern, wherein inspecting comprises obtaining second sensor information describing the blades of the wind turbine while navigating according to the traversal segments and maintaining the relative pose during acquisition of the second sensor information such that the second sensor information is obtained from a consistent spatial relationship relative to the blade.

16. The computer storage media of claim 15, wherein the operation of determining an orientation of the blades comprises:

activating a distance sensor that measures distance from the UAV to the wind turbine, and storing measurements obtained from the distance sensor;

generating, from the stored measurements, a point cloud, the point cloud representing the wind turbine; and determining the orientation of the blades from the generated point cloud.

17. The computer storage media of claim 15, wherein the operation of determining an orientation of the blades comprises:

activating a camera coupled to the UAV, and obtaining at least one image of the wind turbine, including the one or more blades;

determining a pose of the camera for each obtained image based on the physical aspects of the wind turbine, the pose indicating at least a position and an orientation of the camera; and determining the orientation of the blades based on the determined poses and images of the wind turbine.

18. The computer storage media of claim 15, wherein the operation of determining an orientation of the blades comprises:

obtaining a plurality of images of a rotor hub of the wind turbine and a portion of at least one blade that connects to the rotor hub;

generating a point cloud based on the obtained images; and determining the orientation of the blades from the generated point cloud.

19. The computer storage media of claim 15, wherein the operation of inspecting each of the blades comprises at least:

navigating the UAV, via autopilot, along a first blade of the wind turbine from a first blade distal end to a first blade proximal end, the first blade proximal end coupled to a center blade hub of the wind turbine;

while navigating the UAV along the first blade periodically obtaining sensor information describing the first blade;

navigating the UAV, via autopilot, along a second blade from a second blade proximal end to a second blade distal end, the second blade proximal end coupled to the center blade hub of the wind turbine; and while navigating the UAV along the second blade periodically obtaining sensor information describing the second blade.

20. The computer storage media of claim 15, wherein the operation of inspecting each of the blades comprises at least:

navigating the UAV along a first blade for a fixed distance from a first blade proximal end to a first blade distal end, the fixed distance being a value indicating the length of the first blade.

* * * * *